United States Patent [19]

Ozawa

[11] Patent Number: 5,020,506
[45] Date of Patent: Jun. 4, 1991

[54] ENGINE IGNITER

[75] Inventor: Masayuki Ozawa, Himeji, Japan

[73] Assignee: Mitsubishi Denki Kabushiki Kaisha, Tokyo, Japan

[21] Appl. No.: 367,178

[22] Filed: Jun. 16, 1989

[30] Foreign Application Priority Data

Jun. 17, 1988 [JP] Japan .................. 63-79424[U]

[51] Int. Cl.$^5$ .............................................. F02D 1/08
[52] U.S. Cl. .................................................... 123/631
[58] Field of Search ................ 123/631, 630, 651, 602

[56] References Cited

U.S. PATENT DOCUMENTS

| | | | |
|---|---|---|---|
| 4,080,940 | 3/1978 | Fuzzell et al. ...................... | 123/631 |
| 4,086,894 | 5/1978 | Capurka et al. ..................... | 123/631 |
| 4,491,122 | 1/1985 | Piteo .................................... | 123/631 |
| 4,827,891 | 5/1989 | Miura et al. ......................... | 123/631 |

Primary Examiner—Raymond A. Nelli
Attorney, Agent, or Firm—Sughrue, Mion, Zinn, Macpeak & Seas

[57] ABSTRACT

An engine igniter has a reference signal coil which generates an advance-side reference signal and a lag-side reference signal during a half-cycle of the alternating current output of a generator. An ignition timing control circuit determines the direction of rotation of the engine based on the polarity of the alternating current when the reference signals are generated. The ignition timing control circuit controls the ignition timing of an ignition circuit, using the lag-side reference signal as a reference at low engine speeds and using the advance-side reference signal as a reference at high engine speeds. When the engine begins to rotate in reverse, the ignition timing control circuit prevents ignition and stops reverse rotation.

3 Claims, 4 Drawing Sheets

ENGINE IGNITER

BACKGROUND OF THE INVENTION

This invention relates to an engine igniter for an internal combustion engine. More particularly, it relates to an engine igniter which can control the advance and lag angle characteristics of an engine over a wide range and which can prevent the reverse rotation of the engine.

An internal combustion engine is equipped with an engine igniter which controls the ignition timing of the engine in accordance with the engine speed, the ignition advance or lag angle being increased or decreased as the engine speed increases or decreases. A conventional engine igniter includes a signal coil mounted on a generator of the engine. As the generator is driven to rotate by the engine during its operation, the signal coil generates in succession two reference signals within a single half cycle of the output of the generator. One of these reference signals is an advance-side reference signal which is used to determine an appropriate advance angle and a lag angle for ignition timing control during the forward rotation of the engine, while the other is a lag-side reference signal which is used to prevent reverse rotation of the engine. More specifically, an ignition control unit calculates an appropriate ignition timing or crankshaft angle based on the advance-side reference signal and produces an ignition control signal which controls an ignition coil so that a spark plug of the engine is fired at an appropriate crankshaft angle. The advance angle for high-speed engine rotation and the lag angle for low-speed engine rotation are both calculated from the advance-side reference signal, and hence the lag ignition timing is farther away from the advance-side reference signal than the advance ignition timing.

With the conventional generator as described above, since both of the advance angle and the lag angle are calculated from the advance-side reference signal, there arises the following problem. Specifically, if the difference between the advance ignition timing and the lag ignition timing is to be set to a rather great value, the lag ignition timing will be accordingly far behind from the time of generation of the advance-side reference signal, at which various factors including the engine speed for ignition control are measured or detected, resulting in a tendency of fine and accurate ignition control becoming difficult. To avoid this problem, the above difference is required to be rather small, and therefore the ignition timing can be varied over only a narrow range.

SUMMARY OF THE INVENTION

Accordingly, it is an object of the present invention to provide an engine igniter for an internal combustion engine which can adjust the ignition timing over a a wider range than can a conventional engine igniter.

It is another object of the present invention to provide an engine igniter which can prevent the engine from rotating in reverse.

An engine igniter in accordance with the present invention has a current generating coil which generates an alternating current in synchrony with the rotation of the engine, an ignition circuit which generates an ignition voltage from the output of the current generating coil, and a reference signal generator for generating an advance-side reference signal and an advance-side reference signal during a single half-cycle of the output signal of the current generating coil, each of the reference signals corresponding to a prescribed crankshaft angle of the engine. An ignition timing control circuit controls the ignition circuit in accordance with the alternating current from the current generating coil and the reference signals from the reference signal generator. The control circuit determines the direction of rotation of the engine based on the polarity of the alternating current from the current generating coil at the time that the reference signals are generated. When the engine is rotating forwards at less than a prescribed speed, the ignition timing control circuit controls the ignition timing with the lag-side reference signal as a reference so that ignition takes place at or after the time of the lag-side reference signal. When the engine is rotating forwards at greater than the prescribed speed, the ignition timing control circuit controls the ignition timing with the advance-side reference signal as a reference, and ignition takes place at a point in time between the advance-side reference signal and the lag-side reference signal. When the engine is rotating in reverse, the ignition timing control circuit prevents ignition and thereby stops the rotation of the engine.

BRIEF DESCRIPTION OF THE DRAWINGS

FIG. 6 shows the ignition timing characteristics of a conventional engine igniter.

DESCRIPTION OF THE PREFERRED EMBODIMENT

Figure 1:
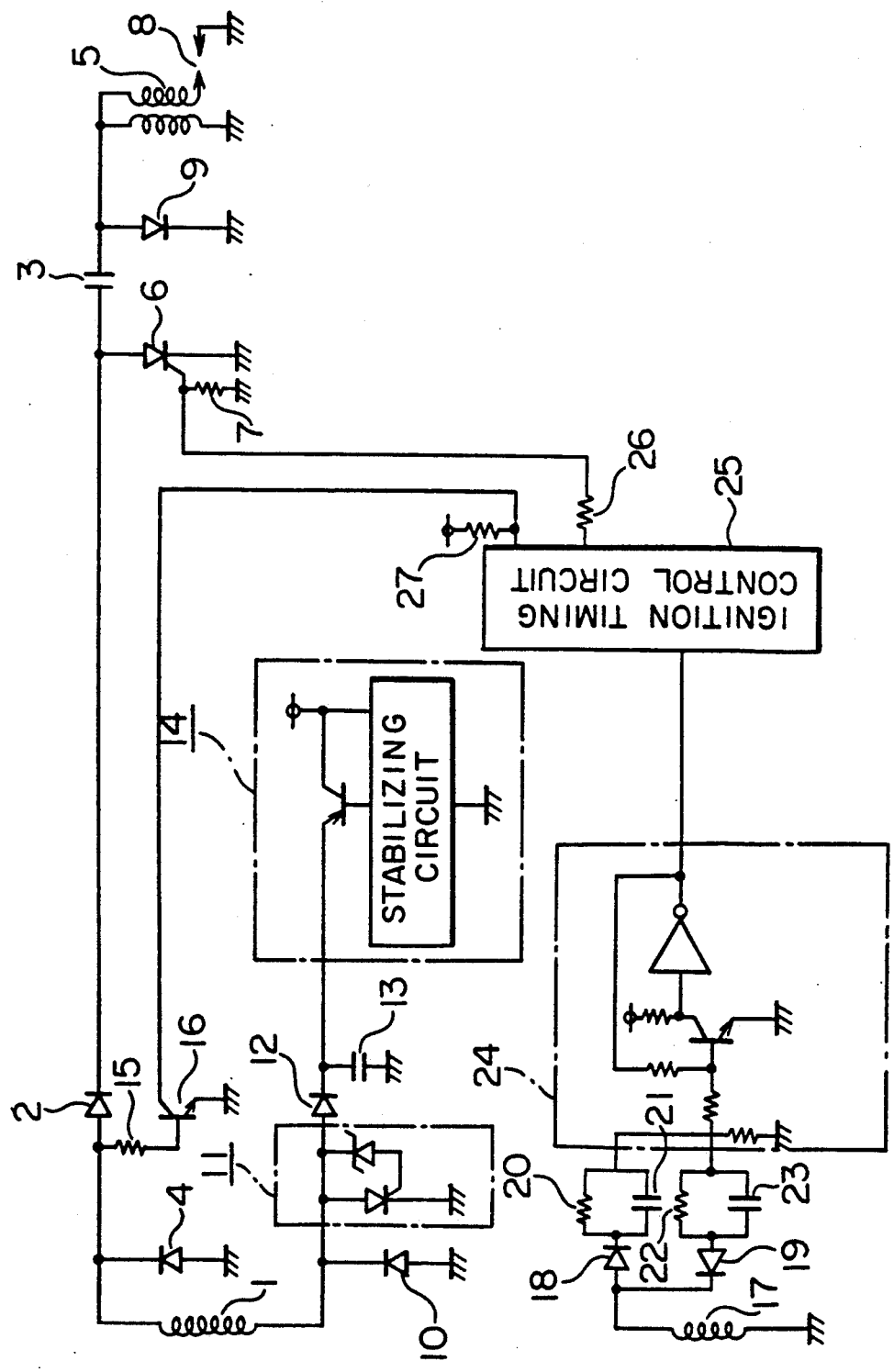
FIG. 1 is a circuit diagram of an embodiment of the present invention.

Hereinbelow, a preferred embodiment of an engine igniter in accordance with the present invention will be described while referring to the accompanying drawings. FIG. 1 is a circuit diagram of this embodiment as applied to an unillustrated engine. As shown in this figure, an unillustrated multi-pole permanent magnet generator which is driven by the engine has a coil 1 which generates an alternating current in synchrony with engine rotation. One end of the coil 1 is connected to the anode of a diode 2 which rectifies the output of the coil 1 and to the cathode of another diode 4 which shorts the negative half-wave of the output of the coil 1. The anode of diode 4 is grounded. The cathode of diode 2 is connected to an ignition coil 5 via a capacitor 3, and the anode is connected to the base of a transistor 16 via a current-limiting resistor 15. The ignition coil 5 is connected to a spark plug 8 which produces sparks in a cylinder of the engine. One side of the capacitor 3 is connected to the anode of a thyristor 6, and the other side is connected to the anode of a diode 9 whose cathode is grounded. Diode 9 absorbs the counter emf which is generated in the ignition coil 5.

The opposite end of coil 1 is connected to the cathode of a diode 10 whose anode is grounded and to a first stabilizing circuit 11 which comprises a thyristor and a Zener diode. The first stabilizing circuit 11 is connected to a second stabilizing circuit 14 via a diode 12. A capacitor 13 is connected between the cathode of diode 12 and ground. The stabilizing circuits 11 and 14 supply a stable current to the other elements of the apparatus.

A signal coil 17 which is mounted on the unillustrated generator produces a negative output pulse followed by a positive output pulse as the generator rotates. One end of the signal coil 17 is grounded, while the other end is connected to the anode of a diode 18 and the cathode of another diode 19. The cathode of diode 18 is connected to a parallel circuit consisting of a resistor 20 and a capacitor 21, while the anode of diode 19 is connected to a parallel circuit consisting of a resistor 22 and a capacitor 23. Each of the parallel circuits is connected to one of the input terminals of a flip-flop 24. The output terminal of the flip-flop 24 is connected to the input terminal of an ignition timing control circuit 25 which is constituted by a microprocessor. The output side of the ignition timing control circuit 25 is connected to a power supply through a resistor 27 and to the collector of the transistor 16. The emitter of the transistor 16 is grounded. The output side of the control circuit 25 is also connected to the gate of the thyristor 6 through a current-limiting resistor 26.

The ignition timing control circuit 25 which receives the output signals from the transistor 16 and the flip-flop 24 calculates an appropriate ignition timing for the spark plug 8 based on these signals, and sends out a corresponding output signal to the thyristor 6. To this end, the ignition timing control circuit 25 performs a control process in accordance with a control program stored therein. An example of such a control program is illustrated in FIG. 5.

Figure 5:
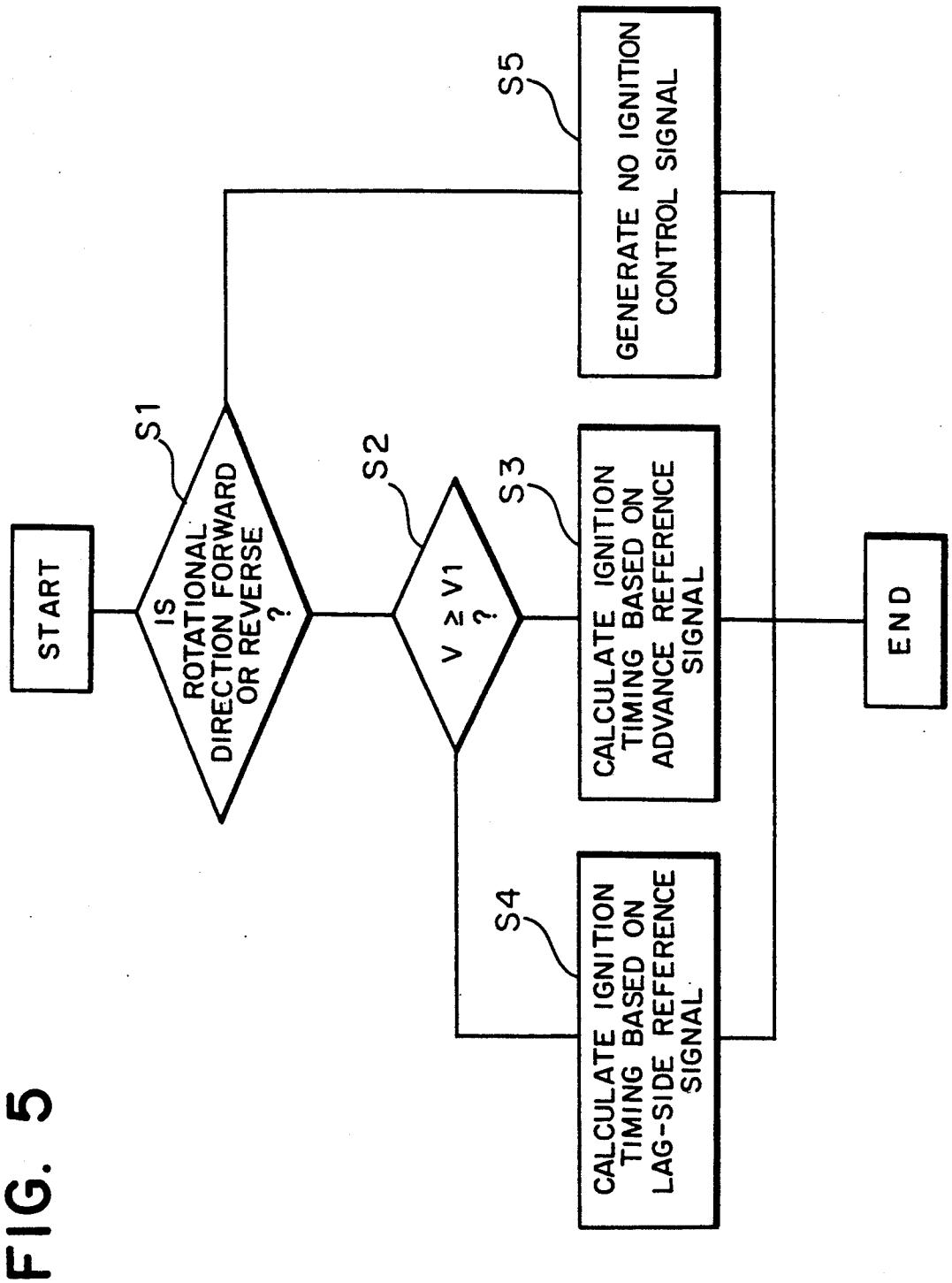
FIG. 5 shows a control program applicable to the circuit of FIG. 1.

In FIG. 5, the ignition timing control circuit 25 first determines, based on the polarity in the output of the signal coil 1, whether the direction of rotation of the engine is forward or reverse in Step S1. If the rotational direction of the engine is determined to be forward, the control program then proceeds to Step S2 wherein it is further determined whether the rotational speed of the engine V is equal to or greater than a prescribed reference speed V1. If V≧V1, then in Step S3 the ignition timing is calculated based on the advance-side reference signal and a corresponding ignition timing control signal is fed from the ignition timing control circuit 25 to the thyristor 6. On the other hand, if it is determined that V<V1 in Step S2, then in Step S4 the ignition timing is calculated based on the lag-side reference signal and a corresponding ignition timing control signal is fed from the ignition timing control circuit 25 to the thyristor 6. Turning back to Step S1, if it is determined that the rotational direction of the engine is reverse, the control program proceeds to Step S5 wherein no ignition timing control signal is generated. Thereafter, the control program terminates.

Figure 2:
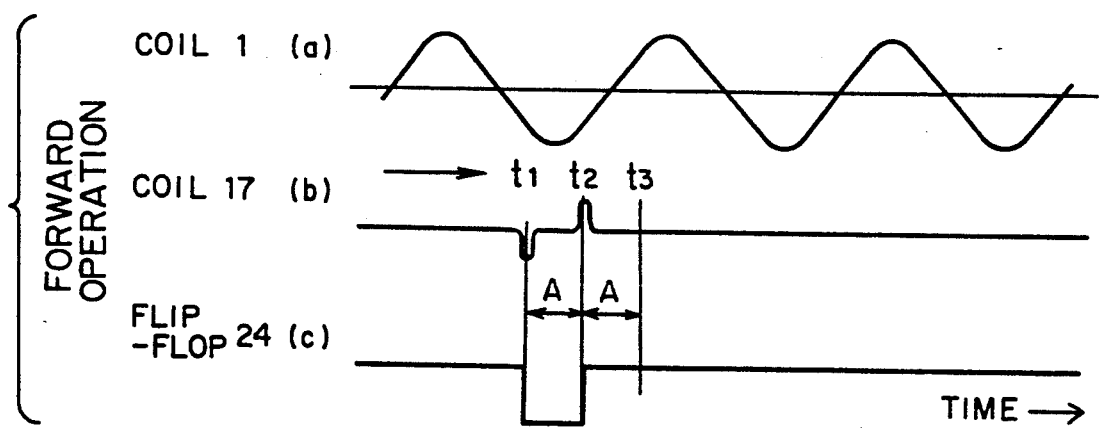
FIGS. 2 and 3 are waveform diagrams of the output signals of coil 1, coil 17, and flip-flop 24 of FIG. 1 during forward and reverse operation, respectively.

The operation of the illustrated igniter will first be described for forward operation of the engine. When the engine is rotating forwards, the generator rotates in synchrony with the engine, and coil 1 produces an AC voltage as shown by FIG. 2a. This voltage is rectified by diode 2 and charges capacitor 3. The negative half-wave of the output of coil 1, which does not contribute to the charging of the capacitor 3, is shorted through diode 4.

As shown in FIG. 2b, during a negative half-cycle of the output signal of coil 1, the signal coil 17 generates first a negative pulse at time t1 and then a positive pulse at time t2 at prescribed crankshaft angles. The negative pulse will be referred to as an advance-side reference signal, while the positive pulse will be referred to as a lag-side reference signal. These reference signals are input to the flip-flop 24, and as shown in FIG. 2c, the flip-flop 24 generates an output pulse of width A whose falling edge corresponds with the negative pulse at time t1 and whose rising edge corresponds to the positive pulse at time t2. The output pulse of the flip-flop 24 is input to the ignition timing control circuit 25, which calculates the appropriate ignition timing in accordance with the engine speed and then generates an output signal which triggers the thyristor 6. This causes the thyristor 6 to conduct and discharge the capacitor 3. As a result, a high voltage is generated in the ignition coil 5 and applied to the spark plug 8, which fires to ignite an engine cylinder.

The ignition timing control circuit 25 determines the direction of rotation of the engine based on the polarity of the output signal of coil 1 when the reference signals are generated. During forward rotation, coil 17 generates the reference signals during the negative half-cycle of the output of coil 1, at which time transistor 16 is turned off. Therefore, at this time, the collector of transistor 16 is at a high voltage, and a high input signal is provided to the ignition timing control circuit 25. Based on this high input signal, the ignition timing control circuit 25 determines that the engine is rotating in the forward direction.

When the engine is rotating forwards at below a prescribed speed, the ignition timing which is determined by the ignition timing control circuit 25 is set with respect to the lag-side reference signal at time t2 so that ignition takes place at or after the lag-side reference signal. In this embodiment, ignition can take place as late as time t3, which occurs after time t2 by an amount A.

Figure 4:
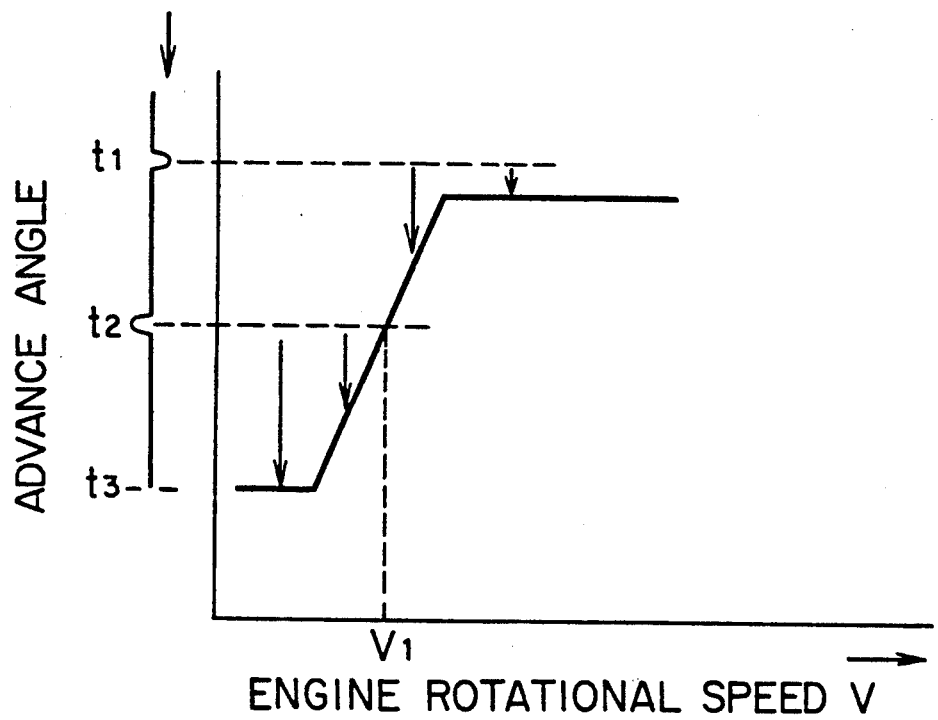
FIG. 4 shows the advance angle characteristics of the embodiment of FIG. 1 as a function of engine speed.

In contrast, when the engine is rotating forwards at above the prescribed speed, the ignition timing control circuit 25 sets the ignition timing with respect to the advance-side reference signal at time t1 so that ignition takes place between the advance-side reference signal and the lag-side reference signal. FIG. 4 illustrates the ignition timing characteristics of the embodiment of FIG. 1. The time at which the thyristor 6 is gated in order to cause the spark plug 8 to fire can be varied from a point in time shortly after time t1 to as late as time t3.

Figure 6:
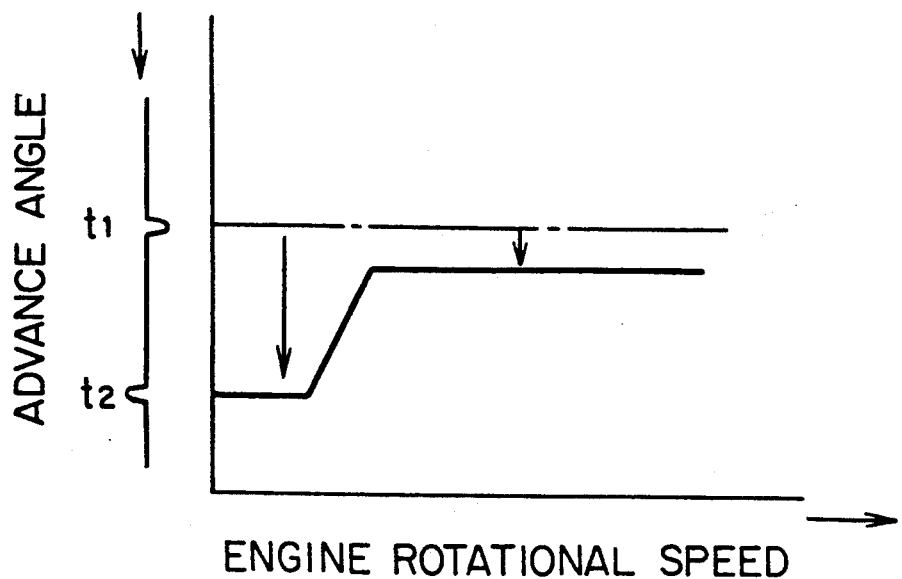
FIG. 6 shows the advance angle characteristics of a conventional engine igniter.

The range over which the ignition timing can be adjusted is therefore much greater than for a conventional engine igniter. This can be seen by a comparison with FIG. 6, which illustrates the ignition timing characteristics of a conventional engine igniter. In the prior art, the ignition timing is always set with respect to the advance-side reference signal at time t1, and ignition can take place no later than the lag-side reference signal at time t2. As (t3−t2)=(t2−t1), the embodiment of FIG. 1 provides twice as large a range over which the ignition timing can be adjusted as does a conventional engine igniter.

Furthermore, in accordance with the present invention, it is possible to shorten the length of time required for calculating the ignition timing, so that the length of time between the generation of a reference signal and engine ignition can be decreased.

Figure 3:
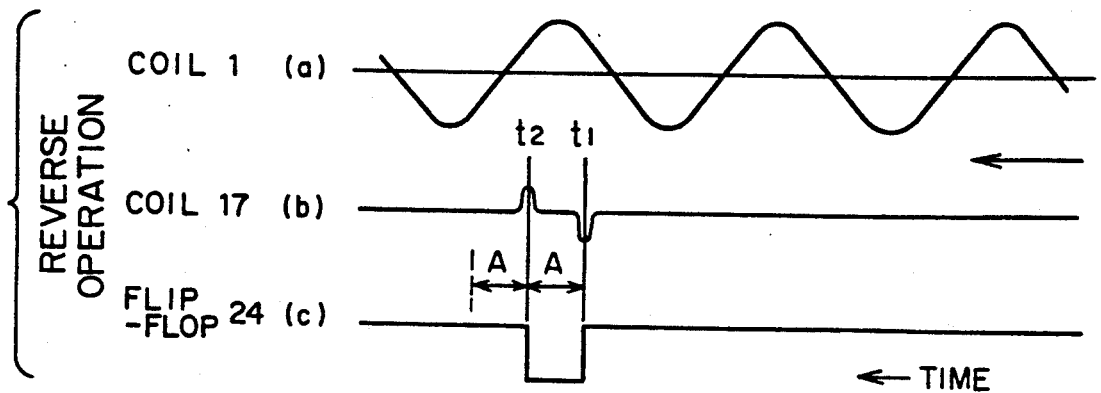

Next, the operation of the engine igniter will be described for reverse rotation. FIG. 3 shows the output signals of coil 1, coil 17, and the flip-flop 24 during reverse rotation. At this time, the reference signals are generated by coil 17 occur during a positive half-cycle of the output of coil 1 rather than during a negative half-cycle. Therefore, when the reference signals are generated, transistor 16 is turned on, and a low level signal is input to the ignition timing control circuit 25 from the collector of transistor 16. Based on this low level signal, the ignition timing control circuit 25 determines that the engine is rotating in reverse. Therefore, the control circuit 25 does not generate an output pulse to operate the thyristor 6. No sparks are generated by the spark plug 8, and no ignition of the engine takes place, so the engine stops rotating and reverse rotation is prevented.

In the embodiment of FIG. 1, the time t3 which corresponds to the lates point at which ignition can occur follows time t2 by an amount A. However, the length of the period between times t2 and t3 is not restricted to A.

What is claimed is:

1. An engine igniter comprising:
   current generating means for generating an alternating current in synchrony with the rotation of an engine;
   reference signal generating means for generating an advance-side reference signal followed by a lag-side reference signal during a half-cycle of the alternating current from the current generating means, each of the reference signals corresponding to a prescribed rotational angle of the engine;
   igniting means for generating an ignition voltage from the alternating current from said current generating means and firing a spark plug of the engine; and
   ignition timing control means responsive to the reference signals and the alternating current for determining the direction of rotation of the engine based on the polarity of the alternating current when the reference signals are generated, for calculating the ignition timing and controlling said igniting means using the lag-side reference signal as a reference during forward operation of the engine at below a prescribed engine speed and using the advance-side reference signal as a reference during forward operation of the engine at above the prescribed engine speed, and for preventing ignition from taking place during reverse rotation of the engine.

2. An engine igniter as claimed in claim 1, wherein said ignition timing control means controls said igniting means such that ignition takes place between the time of the advance-side reference signal and the time of the lag-side reference signal when the engine speed exceeds the prescribed engine speed and such that ignition takes place between the time of the lag-side reference signal and a third point in time when the engine speed is below said prescribed engine speed.

3. An engine igniter as claimed in claim 2, wherein the difference between the time of the advance-side reference signal and the time of the lag-side reference signal equals the difference between the time of the lag-side reference signal and the third point in time.

* * * * *